United States Patent
Abe

(10) Patent No.: US 9,886,221 B2
(45) Date of Patent: *Feb. 6, 2018

(54) IMAGE FORMING APPARATUS RECEIVING PRINT DATA WITH APPENDED COMMAND FOR TERMINATING A WIRELESS CONNECTION

(71) Applicant: Seiko Epson Corporation, Tokyo (JP)

(72) Inventor: Hiroki Abe, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/958,545

(22) Filed: Dec. 3, 2015

(65) Prior Publication Data

US 2016/0162230 A1 Jun. 9, 2016

(30) Foreign Application Priority Data

Dec. 4, 2014 (JP) ................................. 2014-245610

(51) Int. Cl.
*G06F 3/12* (2006.01)

(52) U.S. Cl.
CPC .......... *G06F 3/1236* (2013.01); *G06F 3/1204* (2013.01); *G06F 3/1292* (2013.01)

(58) Field of Classification Search
CPC ..... G06F 3/1236; G06F 3/1292; G06F 3/1204
USPC ........................................................ 358/1.15
See application file for complete search history.

(56) References Cited

U.S. PATENT DOCUMENTS

| | | | |
|---|---|---|---|
| 6,865,620 B2* | 3/2005 | Homma | G03G 15/5075 358/1.1 |
| 9,681,021 B2 | 6/2017 | Abe | |
| 2006/0114499 A1 | 6/2006 | Sumita et al. | |
| 2006/0238804 A1* | 10/2006 | Hyogo | G06F 3/1204 358/1.15 |
| 2008/0259380 A1* | 10/2008 | Nuggehalli | G06F 21/608 358/1.15 |
| 2010/0208299 A1* | 8/2010 | Sakuda | G06F 3/1285 358/1.15 |
| 2014/0104443 A1 | 4/2014 | Takahashi et al. | |
| 2014/0297054 A1 | 10/2014 | Tsai | |
| 2014/0320909 A1* | 10/2014 | Shimazaki | H04W 8/005 358/1.15 |
| 2015/0026302 A1* | 1/2015 | Yamada | H04L 12/2812 709/218 |
| 2015/0153968 A1 | 6/2015 | Inoue | |

(Continued)

FOREIGN PATENT DOCUMENTS

| | | |
|---|---|---|
| JP | 2004-328161 A | 11/2004 |
| JP | 2006-155036 A | 6/2006 |
| JP | 2010-011423 A | 1/2010 |

*Primary Examiner* — Eric A. Rust
(74) *Attorney, Agent, or Firm* — Nutter McClennen & Fish LLP; John J. Penny, Jr.; Santiago Velez

(57) ABSTRACT

Terminating a wireless connection is simplified. A printer has a print unit that prints on recording media; a wireless communication unit configured to communicate wirelessly; and a control unit. When print data with a specific command appended is received from the external device unit, the control unit executes a terminate communication process that cuts the wireless connection based on the specific command after controlling the print unit to print based on the print data.

21 Claims, 4 Drawing Sheets

(56) References Cited

U.S. PATENT DOCUMENTS

| | | | |
|---|---|---|---|
| 2015/0193183 A1* | 7/2015 | Ichikawa | G06F 3/1292 358/1.15 |
| 2016/0062709 A1 | 3/2016 | Itami | |
| 2016/0165092 A1 | 6/2016 | Abe | |

* cited by examiner

IMAGE FORMING APPARATUS RECEIVING PRINT DATA WITH APPENDED COMMAND FOR TERMINATING A WIRELESS CONNECTION

The present invention claims benefit from Japanese Application No. 2014-245610 filed on December 4 which is hereby incorporated by reference in its entirety.

BACKGROUND

1. Technical Field

The present invention relates to a printing device, a printing system, a control method of a printing device, and a storage medium.

2. Related Art

Printers (printing devices) that open a wireless communication link (link) and communicate wirelessly by Bluetooth® are known from the literature. See, for example, JP-A-2006-155036.

A problem with such printers is that terminating a wireless connection opened by the printer requires the operator to perform a tedious operation on the device the printer is communicating with.

SUMMARY

A printing device, a printing system, a control method of a printing device, and a storage medium according to the invention simplify terminating a wireless connection.

A printing device according to one aspect of the invention includes: a print unit configured to print on recording media; a wireless communication unit configured to communicate wirelessly with an external device; and a control unit configured to control the print unit and the wireless communication unit. The control unit connects wirelessly to the external device through the wireless communication unit; and after controlling the print unit based on the print data when print data with a specific command appended is received from the external device by the wireless communication unit, terminates the wireless connection between the external device and the wireless communication unit based on the specific command.

A wireless connection between a printing device and a control device can thus be easily terminated.

In a printing device according to another aspect of the invention, the specific command includes a first specific parameter, and requests response data with a second specific parameter after control of the print unit based on the print data is completed.

This aspect of the invention enables terminating the wireless connection to the printing device by sending print data to which a response request command with a specific parameter is added to the printing device.

In a printing device according to another aspect of the invention, the control unit reports the response data with the second specific parameter to the external device when the specific command is received, and then ends the wireless connection after receiving a response to the report from the external device.

Thus comprised, the printing device can terminate the wireless connection in response to response data that was reported.

The content of the first specific parameter and the second specific parameter are identical.

In a printing device according to another aspect of the invention, the control unit enables receiving print data from another external device through the communication unit after cutting the wireless connection in response to receiving the print data with the specific command appended.

The printing device can therefore receive print data from a different external device after terminating the wireless connection in response to receiving print data with a specific command appended.

Another aspect of the invention is a printing system including: a control device; and a printing device configured to connect wirelessly to the control device and print on recording media based on print data received from the control device. The control device sends print data with a specific command appended to the printing device. The printing device terminates the wireless connection to the external device based on the specific command after receiving print data with the specific command appended and printing based on the print data.

A wireless connection between a printing device and a control device can thus be easily terminated.

In a printing system according to another aspect of the invention, the specific command includes a first specific parameter, and requests response data with a second specific parameter after printing the print data is completed.

This aspect of the invention enables terminating a wireless connection to the printing device by the control device sending print data to which a response request command with a parameter of a specific value is added to the printing device.

In a printing system according to another aspect of the invention, the printing device reports the response data with the second specific parameter to the control device when the specific command is received; the control device responds that the wireless connection port was closed in response to the report from the printing device; and the printing device terminates the wireless connection based on the response from the control device.

Thus comprised, the printing device can terminate the wireless connection after the control device closes the communication port.

The content of the first specific parameter and the second specific parameter are identical.

In a printing system according to another aspect of the invention, the printing device enables receiving print data from another external device after cutting the wireless connection in response to receiving the print data with the specific command appended.

The printing device can therefore receive print data from a different external device after terminating the wireless connection in response to receiving print data with a specific command appended.

A control method of a printing device according to another aspect of the invention is a control method of a printing device capable of communicating wirelessly with an external device, the control method including: connecting wirelessly to the external device; and after printing based on the print data when print data with a specific command appended is received from the external device, terminating the wireless connection to the external device based on the specific command.

A wireless connection between a printing device and a control device can thus be easily terminated.

A storage medium storing a program according to another aspect of the invention is a storage medium storing a program executed by a control unit that controls parts of a printing device configured to communicate wirelessly with an external device, the program causing the control unit to: connect wirelessly to the external device; and after printing based on the print data when print data with a specific command appended is received from the external device, terminate the wireless connection to the external device based on the specific command.

A wireless connection between a printing device and a control device can thus be easily terminated.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
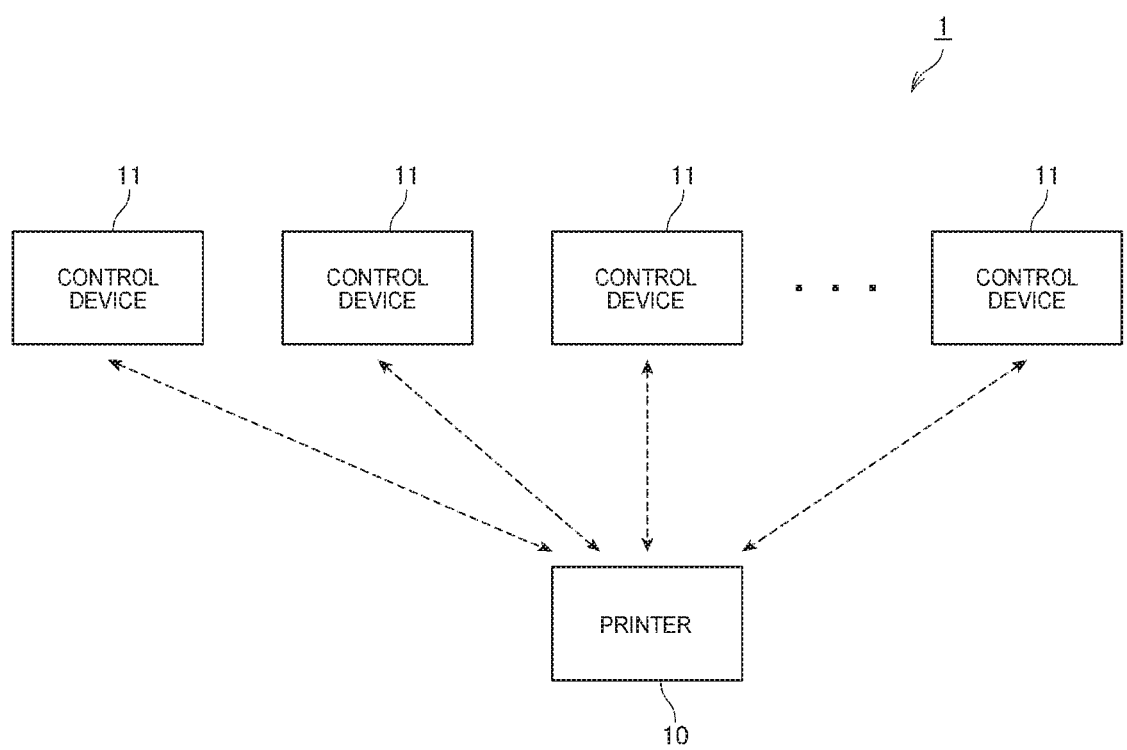
FIG. 1 is a block diagram illustrating the configuration of a printing system according to a preferred embodiment of the invention.

FIG. 1 illustrates a printing system 1 according to this embodiment of the invention.

As shown in FIG. 1, the printing system 1 includes a printing device (printer) 10 and one or more control devices 11 (external devices) that the printer 10 can communicate with using Bluetooth®.

The printer 10 in this example is a thermal line printer, and can tickets by recording images on stored roll paper (recording media) and then cutting the paper.

The control device 11 may be a mobile device such as a smartphone or tablet computer.

The printer 10 and control device 11 are used as described below in this example.

The printer 10 is installed at a specific location in a restaurant, supermarket, or other business. A customer of the business wirelessly connects the customer's own control device 11 by Bluetooth to the printer 10, and starts a dedicated application AP that was previously installed on the control device 11. The customer then instructs producing a coupon through a user interface provided by a function of the dedicated application AP. The control device 11 then controls the printer 10 in response to this command by a function of the dedicated application AP so that the printer 10 produces the coupon. The customer then acquires the coupon produced by the printer 10 and uses it at the store as needed.

Note that a wireless connection as used herein means establishing a communication link according to the Bluetooth protocol between the printer 10 and the control device 11 so that data can be sent and received between the devices through the communication link. Terminating the wireless connection means closing the communication link established between the printer 10 and the control device 11, thereby disabling communication of data between the devices.

The printing system 1 used as described above has the following features.

Specifically, the printing system 1 is not limited to the printer 10 connecting 1:1 to a specific control device 11, and instead enables the printer 10 to connect to an indeterminate number of control devices 11. The printer 10 and the control device 11 also use the Bluetooth SPP (Serial Port Profile) for communication through Bluetooth. In this printing system 1, therefore, plural control devices 11 cannot communicate simultaneously with the printer 10, and only one control device 11 can connect wirelessly with the printer 10 at one time.

Figure 2:
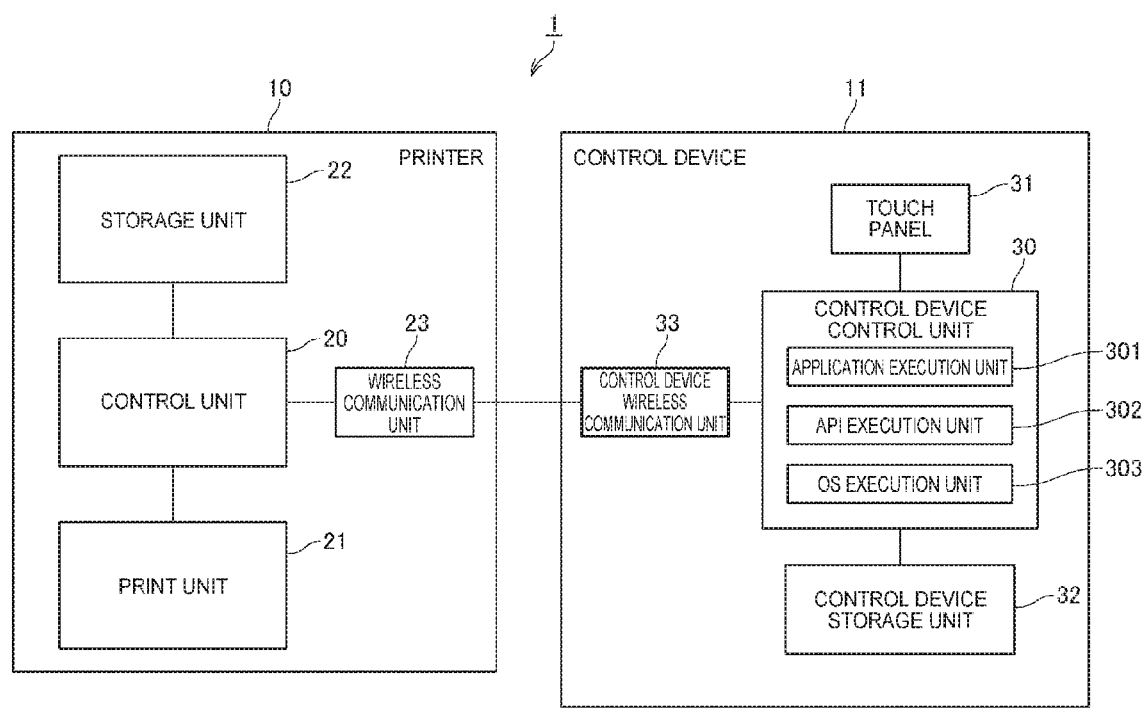
FIG. 2 is a block diagram illustrating the functional configuration of the printing device and the control device.

FIG. 2 is a block diagram illustrating the functional configuration of the printer 10 and the control device 11.

As shown in FIG. 2, the printer 10 is a thermal line printer that stores roll paper and prints images by the thermal line head forming dots on the roll paper.

As shown in FIG. 2, the printer 10 has a control unit 20, print unit 21, storage unit 22, and a wireless communication unit 23.

The control unit 20 includes a CPU, ROM, RAM, and other peripheral circuits, and controls the printer 10. The control unit 20 controls the printer 10 by reading and running installed firmware and other control programs.

The print unit 21 includes a conveyance mechanism that conveys the roll paper stored inside the cabinet of the printer 10, a print mechanism that prints images by forming dots on the roll paper with the thermal head, and a cutting mechanism that cuts the roll paper at a specific position. The print unit 21 produces a coupon as noted above by printing images on the roll paper by the print mechanism while conveying the roll paper with the conveyance mechanism, and then cutting the roll paper at a specific position by the cutting mechanism.

The storage unit 22 is nonvolatile memory and stores data.

The wireless communication unit 23 includes a link manager and a wireless communication module including a link controller, high frequency circuit, and antenna, and establishes a communication link and communicates wirelessly by Bluetooth with the control device 11 as controlled by the control unit 20.

The control device 11 is a mobile device such as a smartphone or tablet computer in this example.

As shown in FIG. 2, the control device 11 includes a control device control unit 30, a touch panel 31, a control device storage unit 32, and a control device wireless communication unit 33.

The control device control unit 30 includes a CPU, ROM, RAM, and other peripheral circuits, and controls the control device 11.

Function blocks of the control device control unit 30 include an application execution unit 301, API execution unit 302, and an OS execution unit 303.

The application execution unit 301 is a function block configured to execute processes by functions of the dedicated application AP.

The API execution unit 302 is a function block configured to execute processes by functions of the API (Application Programming Interface) that are called by the dedicated application AP.

The OS execution unit 303 is a function block configured to execute processed by functions of the operating system (OS) of the control device 11.

The touch panel 31 includes an LCD panel or other display panel, and a touch sensor overlaid on the display panel. The display panel displays images as controlled by the control device control unit 30. The touch sensor detects touch operations, and outputs to the control device control unit 30. Based on input from the touch panel 31, the control device control unit 30 executes processes corresponding to the touch operation.

The control device storage unit 32 is nonvolatile memory and stores data.

The control device wireless communication unit 33 has a wireless communication module, and establishes a communication link and communicates wirelessly by Bluetooth with the printer 10 as controlled by the control device control unit 30.

Operation of the control device 11 and printer 10 when producing a coupon is described next.

In the following description the printer 10 and the control device 11 are paired and can communicate wirelessly (a communication link is already established). The dedicated application AP of the control device 11 is also running, and the user interface provided by the dedicated application AP is displayed on the touch panel 31.

The user interface provided by the dedicated application AP has a touch button ("print command button" below) that instructs printing a coupon. The customer touches the print command button to make the printer 10 print a coupon.

When a touch operation of the print command button is detected, the control device control unit 30 of the control device 11 generates print data for producing a coupon. The print data may be independent control data or control data that may contain or have added thereto control commands in the command language of the printer 10.

Next, the control device control unit 30 controls the control device wireless communication unit 33 to send the generated print data to the printer 10.

The control unit 20 of the printer 10 then controls the wireless communication unit 23 to receive the print data sent from the control device 11.

Next, the control unit 20 controls the print unit 21 to produce a coupon based on the received print data.

As described above, an indeterminate number of control devices 11 may connect to the printer 10. Only one control device 11 can connect wirelessly to the printer 10 at any time. As a result, when producing a coupon with the printer 10 based on control by one control device 11 is completed, that one control device 11 and the printer 10 preferably quickly terminate the wireless connection so that another control device 11 can connect wirelessly to the printer 10. This reduces the time another customer must wait to connect, and helps improve customer satisfaction.

Conventionally, the customer must execute a process such as described below to end the wireless connection between the control device 11 and printer 10.

In this process, the customer performs a specific operation on the control device 11 to switch the display from the user interface provided by the dedicated application AP to a user interface provided by the OS of the control device 11 to terminate the wireless connection. Next, the customer inputs a command through the user interface provided by the OS of the control device 11 to terminate the wireless connection. In response to this input, the control device 11 terminates the wireless connection by a function of the OS, for example. The operation the user must perform to end the wireless connection is thus tedious and complicated.

To solve this problem, the printer 10 and the control device 11 of the invention execute the following process to terminate the wireless connection.

The control device 11 in this embodiment of the invention has two operating modes for terminating the wireless connection, a first mode and a second mode. The customer can change the operating mode by a specific means.

The operation of the printer 10 and the control device 11 is described next, first when the operating mode of the control device 11 is set to the first mode and then when the control device 11 is set to the second mode.

First Mode

Figure 3:
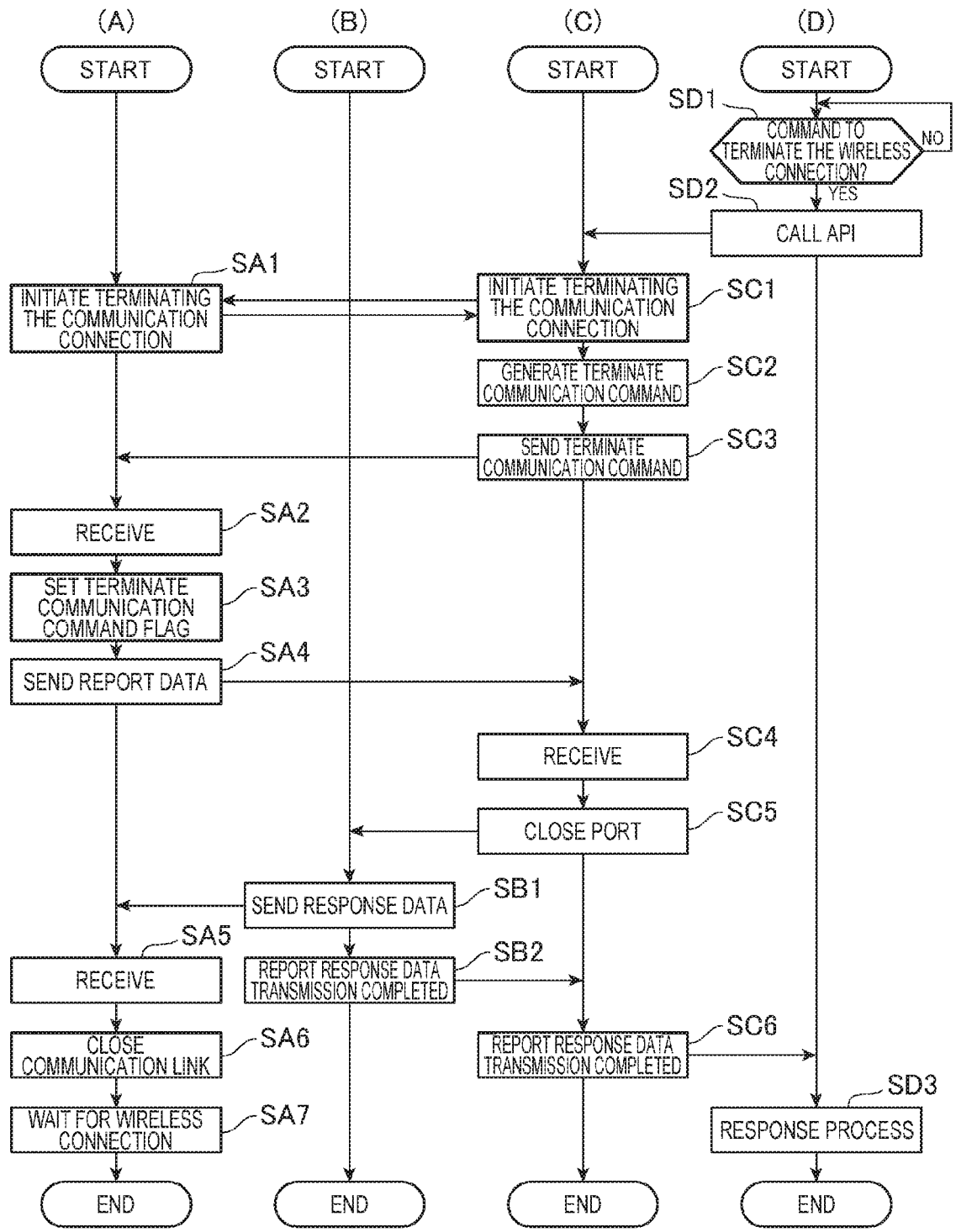
FIG. 3 is a flow chart of one example of the operation of the printing device and control device.

FIG. 3 is a flow chart of the operation of the printer 10 and the control device 11 when the operating mode of the control device 11 is set to the first mode, column (A) of FIG. 3 showing the operation of the printer 10, and columns (B), (C), and (D) of FIG. 3 showing the operation of the control device 11. More particularly, column (B) of FIG. 3 shows the operation of the OS execution unit 303 of the control device 11, column (C) of FIG. 3 shows the operation of the API execution unit 302, and column (D) of FIG. 3 shows the operation of the application execution unit 301.

When the operation shown in the flowchart shown in FIG. 3 starts, the printer 10 and the control device 11 and paired and the devices can communicate wirelessly (a communication link is established).

When the operation shown in column (C) of FIG. 3 starts, the dedicated application AP of the control device 11 is running, and the user interface provided by the dedicated application AP is displayed on the touch panel 31.

As shown in column (D) of FIG. 3, the application execution unit 301 of the control device 11 monitors if terminating the wireless connection was commanded (step SD1). The user interface provided by the dedicated application AP has a touch button for commanding terminating the wireless connection. The customer can command terminating the wireless connection by touching this touch button.

In this example, the customer can terminate the wireless connection by the simple operation of touching the touch button on the user interface provided by the dedicated application AP.

If terminating the wireless connection is commanded (step SD1: YES), the application execution unit 301 calls a specific API (step SD2). The API called by the application execution unit 301 in step SD2 is an API with the ability to execute the steps shown in column (C) of FIG. 3, and may be embodied by multiple APIs. Below, the process of the API execution unit 302 is executed by a function of the API called in step SD2.

In response to the API being called, the API execution unit 302 executes a process with the control unit 20 of the printer 10 to initiate ending the communication connection (step SA1, step SC1).

This process of initiating ending the communication connection is a process of cancelling the DMA (direct memory access) transfer mode if the printer 10 is in the DMA transfer mode (described below). When the printer 10 is in the DMA transfer mode, the printer 10 cannot execute a terminate communication command (referred to below as simply a command) sent from the control device 11 and cannot terminate the wireless connection. The DMA transfer mode must therefore be cancelled before the terminate communication command is sent. The control device 11 can send to the printer 10 an image data print command that contains image data of a specific size and instructs printing an image based on the image data. This image data print command includes size information specifying the size of the image data.

When the printer 10 receives the image data print command, the command is stored in a receive buffer. When the image data print command is stored in the receive buffer and the command is then processed, the control unit 20 of the printer 10 goes to the DMA transfer mode, controls the DMA controller, and transfers the image data at high speed by sending the image data stored in the receive buffer by DMA transfer directly to the image buffer without going through the CPU. The control unit 20 then cancels the DMA transfer mode when DMA transfer of image data of the size indicated by the size information in the image data print command is completed.

Note that if another control command (other command) is stored in the receive buffer while in the DMA transfer mode, the control command (command) is not read and the process based on the control command is not executed, and the DMA transfer mode is not cancelled until receiving image data of the size indicated by the size information is received and DMA transfer of the received image data is completed. This so that rendering the image data in the image buffer and printing an image based on the image data rendered in the image buffer are completed normally.

It is also possible when in the DMA transfer mode that image data reception is not completed normally due to a communication error, for example, DMA transfer of the amount of image data indicated by the size information is therefore not completed, and the DMA transfer mode is therefore not cancelled.

In the process initiating ending the communication connection, the API execution unit 302 of the control device 11 sends to the printer 10 null data (data with no meaning) of the maximum size of the image data that can be contained in the image data print command. When in the DMA transfer mode and this null data is received from the control device 11, the control unit 20 of the printer 10 completes DMA transfer of the amount of image data indicated by the size information and then cancels the DMA transfer mode. Note that the null data is simply discarded when not in the DMA transfer mode.

The DMA transfer mode is reliably cancelled by this process initiating ending the communication connection even if the printer 10 is in the DMA transfer mode, and the printer 10 is able to execute the terminate communication command (described below).

Note that the API execution unit 302 may send null data when a command to terminate the wireless connection is received, or as described below.

Specifically, when there is a command to terminate the wireless connection, the API execution unit 302 may query the printer 10 to determine if it is in the DMA transfer mode. Based on the query, the control unit 20 of the printer 10 reports whether or not the DMA transfer mode is enabled. The API execution unit 302 then sends null data if the printer 10 is in the DMA transfer mode, and does not send null data if not. This prevents unnecessarily sending null data and improves efficiency.

As shown in column (C) of FIG. 3, after executing the process initiating ending the communication connection, the API execution unit 302 generates a terminate communication command (step SC2). The terminate communication command (specific command) is a control command instructing terminating the wireless connection.

The terminate communication command is an example of a real-time command. A real-time command is a command that the printer 10 can receive even when an error has occurred, and is executed with priority over other received control commands.

When the printer 10 receives a real-time command, the real-time command is stored in the receive buffer. The control unit 20 of the printer 10 has a function for monitoring the types of control commands stored in the receive buffer, and detecting that a real-time command was received when a real-time command is stored. A real-time command is identified by a specific type of command code, and real-time commands can be detected by determining if the command code of a stored command is a command code identifying a real-time command.

If the control unit 20 detects that a real-time command was stored in the receive buffer, the control unit 20 reads and runs the real-time command before other control commands.

This process enables the printer 10 to immediately execute processes based on real-time commands when a real-time command is received.

Next, the API execution unit 302 controls the control device wireless communication unit 33 to send the terminate communication command generated in step SC2 to the printer 10 (step SC3).

As shown in column (A) of FIG. 3, the control unit 20 of the printer 10 controls the wireless communication unit 23 to receive the terminate communication command (step SA2). As described above, because a terminate communication command is a real-time command, it is read and executed before other control commands as soon as it is stored in the receive buffer.

Next, the control unit 20 sets a terminate communication command flag, which is a flag indicating a terminate communication command was received (step SA3). The terminate communication command flag is stored in a specific storage area.

Next, the control unit 20 controls the wireless communication unit 23 to send report data indicating that a terminate communication command was received to the control device 11 (step SA4).

As shown in column (C) of FIG. 3, the API execution unit 302 of the control device 11 controls the control device wireless communication unit 33 to receive the report data (step SC4).

Next, the API execution unit 302 closes the port that was opened when a communication link was established with the printer 10 (step SC5). This port is a virtual serial port that is used for communication with the printer 10. Data communicated through this port is shaped and converted appropriately to the standard of the interface between the control device 11 and printer 10 (a serial communication standard such as RS232C or USB) to enable processing by both the control device 11 and the printer 10.

In step SC5, the API execution unit 302 reports to the OS execution unit 303 that the port was closed according to the port closing process. This report may be made using an API provided by the OS.

As shown in column (B) of FIG. 3, based on the report that the port was closed, the OS execution unit 303 controls the control device wireless communication unit 33 to send response data responding that the port was closed to the printer 10 (step SB1).

After completing transmission of the response data, the OS execution unit 303 reports that transmission of the response data was completed to the API execution unit 302 (step SB2).

As shown in column (C) of FIG. 3, based on this report that transmission of the response data was completed, the API execution unit 302 reports to the application execution unit 301 that transmission of the response data was completed (step SC6). The report of step SC6 is done by sending a specific return value from the API to the dedicated application AP.

As shown in column (D) of FIG. 3, the application execution unit 301 of the control device 11 executes an appropriate process based on the report that transmission of the response data was completed (step SD3). For example, the application execution unit 301 may display in the user interface shown on the touch panel 31 that the wireless connection with the printer 10 was ended and that wireless communication with the printer 10 is not possible.

As shown in column (A) of FIG. 3, the control unit 20 of the printer 10 then controls the wireless communication unit 23 to receive the response data (step SA5).

Next, the control unit 20 cancels the communication link with the control device 11 (step SA6).

Note that the control unit 20 does not cancel the communication link in step SA6 if the terminate communication command flag is not set. As a result, terminating the wireless connection can be prevented when a terminate communication command has not been sent by the control device 11 in response to a customer command, that is, if the customer has not commanded terminating the wireless connection.

Next, the control unit 20 waits for a wireless connection (step SA7). While waiting for a wireless connection, any control device 11 can connect wirelessly to the printer 10.

Note that in the flow chart shown in FIG. 3, the control unit 20 of the printer 10 sends report data to the control device 11 when a terminate communication command is received from the control device 11, and closes the communication link when response data responding to the report data is received from the control device 11. This is because closing the communication link on the printer 10 side is limited by the operating system of the control device 11 and the specifications of the profile compatible with the operating system to after the port is closed on the control device 11.

If this limit is not imposed, the printer 10 may execute a process such as described below. Specifically, when a terminate communication command is received from the control device 11, the control unit 20 of the printer 10 closes the communication link triggered by receiving the terminate communication command. This enables more quickly terminating the wireless connection after the customer asserts a command to terminate the wireless connection, and improves process efficiency because the printer 10 and the control device 11 execute fewer steps.

Note that in FIG. 3 step SA3 to step SA6 embody a communication termination process.

Second Mode

Operation of the printer 10 and the control device 11 when the operating mode of the control device 11 is set to the second mode is described next.

The response request command the control device 11 can send to the printer 10, and the operation of the control device 11 and printer 10 related to the response request command, are described first before describing the operation of the printer 10 and the control device 11.

As described above, the control device 11 can cause the printer 10 to print by sending print data to the printer 10. The control device control unit 30 of the control device 11 can also append a response request command to the end of the print data when sending the print data.

The response request command includes the command code of the command, and a parameter of a value within a specific range. In this embodiment of the invention, the parameter is a three digit value in the range 000 to 999.

When the control device control unit 30 of the control device 11 adds a response request command to print data, it sets the value of the parameter to a specific value. Next, the control device control unit 30 sends the print data with the appended response request command of the specific parameter value to the printer 10.

When print data with an appended response request command is received, the control unit 20 of the printer 10 first controls the print unit 21 by reading and executing the print data stored in the receive buffer.

After control of the print unit 21 based on the print data ends, the control unit 20 reads the response request command and executes the following process. In this process, the control unit 20 acquires the parameter contained in the response request command, and sends parameter response data containing the parameter to the control device 11.

The control device control unit 30 of the control device 11 then receives the parameter response data. By reading the value of the parameter contained in the parameter response data, the control device control unit 30 knows that executing the print data to which the response request command with that parameter was appended finished, and executes an appropriate process.

In this example, the parameter value used in the response request command to terminate the wireless connection is 000. The control device control unit 30 therefore does not use 000 as the parameter value of the response request command when not terminating the wireless connection.

A response request command can also be added to control data other than print data. A response request command can also be sent alone.

Figure 4:
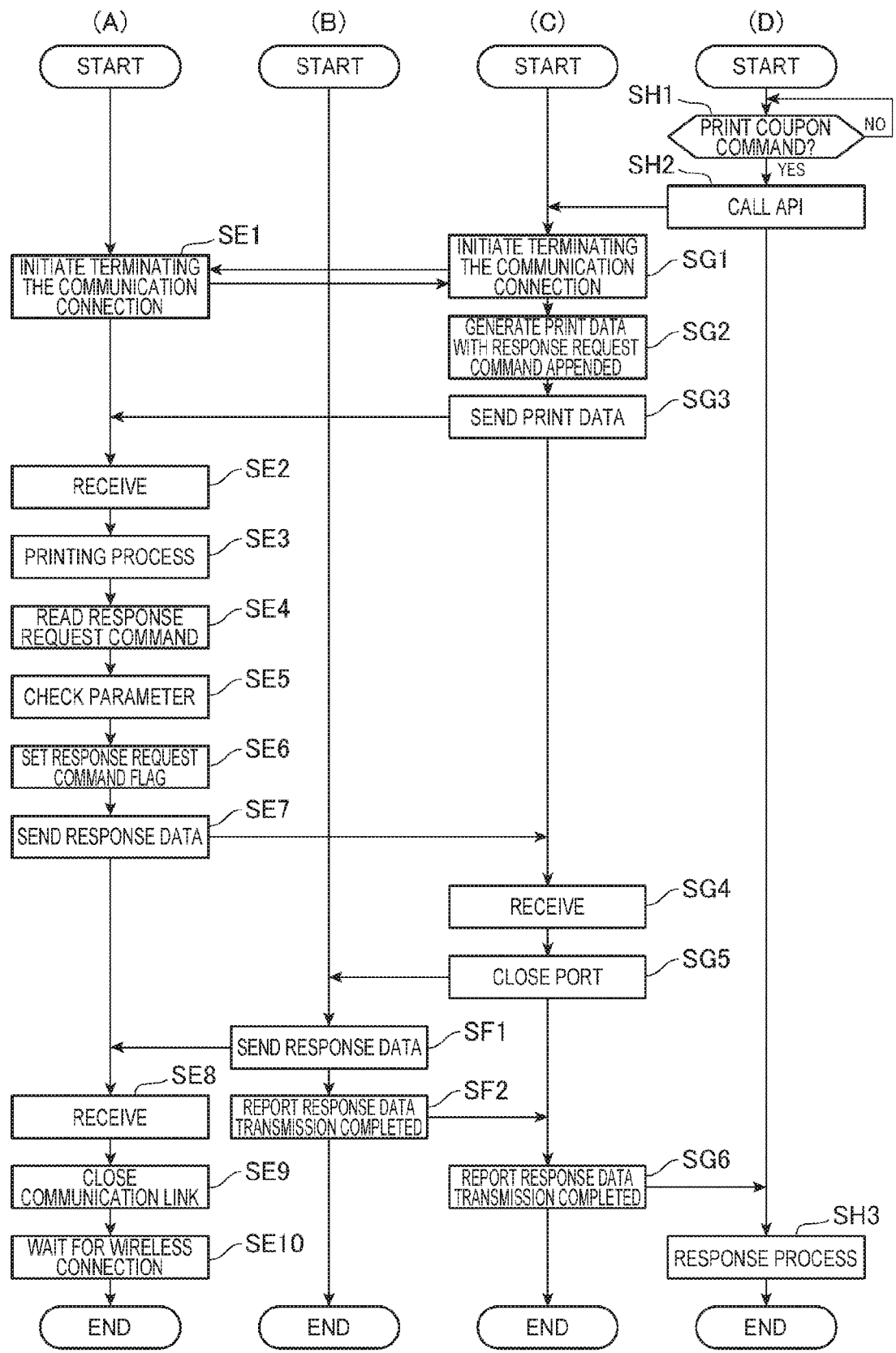
FIG. 4 is a flow chart of another example of the operation of the printing device and control device.

FIG. 4 is a flow chart of the operation of the printer 10 and the control device 11 when the operating mode of the control device 11 is set to the second mode, column (A) of FIG. 4 showing the operation of the printer 10, and columns (B), (C), and (D) of FIG. 4 showing the operation of the control device 11. More particularly, column (B) of FIG. 4 shows the operation of the OS execution unit 303 of the control device 11, column (C) of FIG. 4 shows the operation of the API execution unit 302, and column (D) of FIG. 4 shows the operation of the application execution unit 301.

When the operation shown in the flowchart shown in FIG. 4 starts, the printer 10 and the control device 11 and paired and the devices can communicate wirelessly (a communication link is established).

When the operation shown in column (D) of FIG. 4 starts, the dedicated application AP of the control device 11 is running, and the user interface provided by the dedicated application AP is displayed on the touch panel 31.

When the operating mode of the control device 11 is the second mode, the wireless connection between the printer 10 and the control device 11 is automatically ended based on the response request command described above after a coupon is printed in response to a customer command.

When the flow chart in FIG. 4 starts, the customer has not commanded printing a coupon, and a coupon has not been printed.

As shown in column (D) of FIG. 4, the application execution unit 301 of the control device 11 monitors if a print coupon command was asserted (step SH1).

As described above, the user interface provided by the dedicated application AP has a touch button ("print command button" below) that instructs printing a coupon. When the operating mode of the control device 11 is the second mode, information indicating that the wireless connection between the printer 10 and the control device 11 will be automatically terminated is displayed in the user interface after a coupon is printed in response to the customer touching the print command button.

The customer can terminate the wireless connection in this example by the simple operation of touching the print command button in the user interface.

If the wireless connection was cut (step SH1: YES), the application execution unit 301 calls a specific API (step SH2). The API called by the application execution unit 301 in step SH2 is an API with the ability to execute the steps shown in column (C) of FIG. 4, and may comprise multiple APIs. Below, the process of the API execution unit 302 is executed by a function of the API called in step SH2.

In response to the API being called, the API execution unit 302 executes a process with the control unit 20 of the printer 10 to initiate ending the communication connection (step SE1, step SG1).

As shown in column (C) of FIG. 4, after executing the process initiating ending the communication connection, the API execution unit 302 generates print data and appends a response request command (specific command) to the end of the generated print data (step SG2). The API execution unit 302 sets the value of the parameter (first specific parameter) of the response request command in this instance to 000. This terminate communication command can include the function of the response request command.

Next, the API execution unit 302 controls the control device wireless communication unit 33 to send the print data generated in step SG2 to the printer 10 (step SG3).

As shown in column (A) of FIG. 4, the control unit 20 of the printer 10 then controls the wireless communication unit 23 to receive the print data SE2). The received print data is stored in the receive buffer.

Next, the control unit 20 sequentially reads and runs the control commands contained in the print data stored in the receive buffer to control the print unit 21 and produce a coupon (step SE3).

Next, the control unit 20 reads the response request command appended to the end of the print data (step SE4).

Next, the control unit 20 acquires the parameter of the response request command and recognizes the parameter value is 000 (step SE5).

In step SE5, the control unit 20 knows to terminate the wireless connection with the control device 11 as a result of recognizing the parameter value is 000.

Next, the control unit 20 sets a response request command flag, which is a flag indicating a response request command with a parameter value of 000 was received (step SE6).

Next, the control unit 20 controls the wireless communication unit 23 to send response data with a parameter (second specific parameter) value of 000 to the control device 11 (step SE7).

As shown in column (C) of FIG. 4, the API execution unit 302 of the control device 11 then controls the control device wireless communication unit 33 to receive the response data (step SG4). By receiving and interpreting the response data, the API execution unit 302 knows that executing the print data was completed, knows the parameter value of the response request command from the printer 10 is 000, and knows to execute an appropriate process. Next, the API execution unit 302 closes the port that was opened when a communication link was established with the printer 10 (step SG5).

In step SG5, the API execution unit 302 reports to the OS execution unit 303 that the port was closed according to the port closing process.

As shown in column (B) of FIG. 4, based on the report that the port was closed, the OS execution unit 303 controls the control device wireless communication unit 33 to send response data responding that the port was closed to the printer 10 (step SF1).

After completing transmission of the response data, the OS execution unit 303 reports that transmission of the response data was completed to the API execution unit 302 (step SF2).

As shown in column (C) of FIG. 4, based on this report that transmission of the response data was completed, the API execution unit 302 reports to the application execution unit 301 that transmission of the response data was completed (step SG6). The report of step SG6 is done by sending a specific return value from the API to the dedicated application AP.

As shown in column (D) of FIG. 4, the application execution unit 301 of the control device 11 executes an appropriate process based on the report that transmission of the response data was completed (step SH3). For example, the application execution unit 301 may display in the user interface shown on the touch panel 31 that the wireless connection with the printer 10 was ended and that wireless communication with the printer 10 is not possible.

As shown in column (A) of FIG. 4, the control unit 20 of the printer 10 then controls the wireless communication unit 23 to receive the response data (step SE8).

Next, the control unit 20 cancels the communication link with the control device 11 (step SE9).

Note that the control unit 20 does not cancel the communication link in step SE6 if the response request command flag is not set. As a result, terminating the wireless connection can be prevented when a terminate communication command has not been sent by the control device 11 in response to a customer command, that is, if the customer has not commanded terminating the wireless connection.

Next, the control unit 20 waits for a wireless connection (step SE10). While waiting for a wireless connection, any control device 11 can connect wirelessly to the printer 10.

Note that in the flow chart shown in FIG. 4, the control unit 20 of the printer 10 sends response data to the control device 11 when a response request command with a parameter value of 000 is received from the control device 11, and closes the communication link when a response to the response data is received from the control device 11. This is because closing the communication link on the printer 10 side is limited by the operating system of the control device 11 and the specifications of the profile compatible with the operating system to after the port is closed on the control device 11.

If this limit is not imposed, the printer 10 may execute a process such as described below. Specifically, when a response request command with a parameter value of 000 is received from the control device 11, the control unit 20 of the printer 10 cancels the communication link triggered by receiving the response request command. This enables more quickly terminating the wireless connection after the customer asserts a command to terminate the wireless connection, and improves process efficiency because the printer 10 and the control device 11 execute fewer steps.

Note that in FIG. 4 step SE3 to step SE9 embody a communication termination process.

As described above, when the operating mode of the control device 11 is the first mode in this example, the control device 11 and printer 10 execute the following process. Specifically, the control device 11 sends a terminate communication command instructing terminating the wireless connection, and the printer 10 receives the terminate communication command and executes a communication termination process to cut the wireless connection.

As a result, the wireless connection can be cut by a function of the printer 10 by the control device 11 (external device) sending a terminate communication command to the printer 10. The wireless connection can therefore be cut without the customer needing to perform a tedious task to cut the wireless connection.

The terminate communication command in this embodiment of the invention is a command that the printer 10 executes with priority over other control commands. When a terminate communication command is received, the printer 10 executes a communication termination process based on the received terminate communication command with priority over other control commands.

As a result, when a terminate communication command is sent from the control device 11 to the printer 10 by an action of the customer, the wireless connection can be cut more quickly.

The printer 10 in the embodiment described above reports receiving a terminate communication command to the control device 11 when a terminate communication command is received. Based on this report from the printer 10, the control device 11 closes the port used for the wireless connection and responds that the port was closed. The printer 10 then cuts the wireless connection based on this report from the control device 11.

As a result, the printer 10 can cut a wireless connection appropriately to the operating system of the control device 11 and the specifications of the profile compatible with the operating system.

As described above, when the operating mode of the control device 11 is the second mode in this example, the control device 11 and printer 10 execute the following process. Specifically, the control device 11 sends print data with a specific control command appended. The printer 10 receives the print data with the specific control command, controls the print unit based on the print data, and then cuts the wireless connection based on the specific control command.

By thus sending print data to which a specific control command is appended from the control device 11 (external device) to the printer 10, the wireless connection can be cut by a function of the printer 10 after printing based on the print data. The wireless connection can therefore be cut without the customer needing to perform a tedious task to cut the wireless connection.

In the embodiment described above, the specific control command is a response request command that has a parameter of a specific value, and requests response data with a parameter of the specific value after finishing executing the attached print data.

A characteristic of a response request command can therefore be used to terminate the wireless connection after finishing printing based on the print data.

In this embodiment of the invention, the printer 10 sends response data with a parameter of a specific value to the control device 11 in response to receiving a response request command. In response to receiving the response data, the control device 11 closes the port used for the wireless connection and responds that the port was closed. The printer 10 then cuts the wireless connection based on the response from the control device 11.

As a result, a wireless connection can be cut appropriately to the operating system of the control device 11 and the specifications of the profile compatible with the operating system.

The invention is described above with reference to a preferred embodiment thereof, but the invention is not limited thereto and can be modified and adapted in many ways without departing from the scope of the accompanying claims.

For example, the printing system 1 is used in a retail business and a coupon is produced by the printer 10 as controlled by a control device 11 in the embodiment described above, but use of the printing system 1 is not so limited. More specifically, the invention can be broadly applied to printers 10 that communicate wirelessly, and to systems in which a printer 10 and control device 11 communicate wirelessly.

The printer 10 in the embodiment described above is a thermal printer, but the printing method of the printer 10 is not limited to thermal printing methods and may be inkjet or other type. Furthermore, the printer 10 may be a stationary printer that is used on a stand or table, or a mobile printer that can be carried about, for example.

The operation described in the foregoing embodiment can also be achieved by the CPU of the control unit 20 reading and running a program stored in memory of the control unit 20 or on an external storage medium, for example.

The function blocks described using the accompanying figures can also embodied as desired by the cooperation of hardware and software, such as a CPU reading and running a program, and do not suggest a specific hardware configuration.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printing device comprising one or more processors configured to embody a plurality of functional units comprising:
    a print mechanism configured to print data on recording media;
    a wireless communicator configured to communicate wirelessly with one of a plurality of external devices and receive the print data and a command; and
    a controller configured to control the print mechanism and the wireless communicator, the controller connecting wirelessly to the one of the plurality of external devices through the wireless communicator, and controlling the print mechanism when the print data and a print command are received from the one of the plurality of external devices by the wireless communicator, and responsive to receiving a specific command appended to the print data including a command code and a first specific parameter, and prior to executing other of a plurality of commands appended to the print data, terminating the wireless connection between the one of the plurality of external devices and the wireless communicator,
    wherein the specific command is a type of command having priority over the other of the plurality of commands and enabling receiving thereof by the wireless communicator even when an error occurs in the printing device, and
    wherein the controller detects the type of command by the command code and an instruction to terminate the wireless connection by the first specific parameter in the specific command.

2. The printing device described in claim 1, wherein:
    the first specific parameter further requests response data with a second specific parameter after control of the print mechanism based on the print data is completed.

3. The printing device described in claim 2, wherein: the controller reports the response data with the second specific parameter to the one of the plurality of external devices when the specific command is received, and terminates the wireless connection after receiving a response to the report from the one of the plurality of external devices.

4. The printing device described in claim 2, wherein:
the content of the first specific parameter and the second specific parameter are identical.

5. The printing device described in claim 1, wherein:
the controller enables receiving print data from any external device including the external device that sent the specific command through the wireless communicator after cutting the wireless connection in response to receiving the specific command.

6. A printing system comprising:
a plurality of control devices; and
a printing device configured to connect wirelessly to one of the plurality of the control devices and print on recording media based on print data and a print command received from the one of the plurality of control devices;
the one of the plurality of control devices appending a specific command to the print data; and
the printing device terminating the wireless connection to the one of the plurality of control devices responsive to receiving the specific command including a command code and a first specific parameter and prior to executing other of a plurality of commands appended to the print data,
wherein the specific command is a type of command having priority over the other of the plurality of commands and enabling receiving thereof by the printing device even when an error occurs in the printing device, and
wherein the printing device detects the type of command by the command code and an instruction to terminate the wireless connection by the first specific parameter in the specific command.

7. The printing system described in claim 6, wherein:
the first specific parameter further requests response data with a second specific parameter after printing the print data is completed.

8. The printing system described in claim 7, wherein:
the content of the first specific parameter and the second specific parameter are identical.

9. The printing system described in claim 6, wherein: the printing device reports the response data with a second specific parameter to the one of the plurality of control devices when the specific command is received; the one of the plurality of control devices responds that the wireless connection port was closed in response to the report from the printing device; and the printing device terminates the wireless connection based on the response from the one of the plurality of control devices.

10. The printing system described in claim 6, wherein: the printing device enables receiving print data from any control device including the control device that sent the specific command after cutting the wireless connection in response to receiving the specific command.

11. A control method of a printing device capable of communicating wirelessly with one of a plurality of external devices, comprising:
connecting wirelessly to the one of the plurality of external devices and receiving print data and a command; and
printing when the print data and a print command are received from the one of the plurality of external devices, responsive to receiving a specific command appended to the print data including a command code and a first specific parameter, and prior to executing other of a plurality of commands appended to the print data, terminating the wireless connection to the one of the plurality of external devices,
wherein the specific command is a type of command having priority over the other of the plurality of commands and enabling receiving thereof by the printing device even when an error occurs in the printing device, and
wherein the printing device detects the type of command by the command code and an instruction to terminate the wireless connection by the first specific parameter in the specific command.

12. The control method of a printing device described in claim 11, wherein:
the first specific parameter further requests response data with a second specific parameter after printing based on the print data is completed.

13. The control method of a printing device described in claim 12, further comprising: reporting the response data with the second specific parameter to the one of the plurality of external devices when the specific command is received; and terminating the wireless connection after a response to the report is received from the one of the plurality of external devices.

14. The control method of a printing device described in claim 12, wherein:
the content of the first specific parameter and the second specific parameter are identical.

15. The control method of a printing device described in claim 11, further comprising:
enabling receiving print data from any external device including the external device that sent the specific command after terminating the wireless connection in response to receiving the specific command.

16. A non-transitory storage medium storing a program executed by a controller that controls parts of a printing device configured to communicate wirelessly with one of a plurality of external device, the program causing the controller to:
connect wirelessly to the one of the plurality of external devices and receiving print data and a command; and
print data on recording media when the print data and a print command are received from the one of the plurality of external devices, responsive to receiving a specific command appended to the print data including a command code and a first specific parameter, and prior to executing other of a plurality of commands appended to the print data, terminate the wireless connection to the one of the plurality of external devices,
wherein the specific command is a type of command having priority over the other of the plurality of commands and enabling receiving thereof by the wireless communicator even when an error occurs in the printing device, and
wherein the controller detects the type of command by the command code and an instruction to terminate the wireless connection by the first specific parameter in the specific command.

17. The non-transitory storage medium storing a program described in claim 16, wherein:
the specific command further requests response data with a second specific parameter after printing based on the print data is completed.

18. The non-transitory storage medium storing a program described in claim 17, the program further comprising causing the controller to: report the response data with the second specific parameter to the one of the plurality of external devices when the specific command is received; and terminate the wireless connection after a response to the report is received from the one of the plurality of external devices.

19. The non-transitory storage medium storing a program described in claim 17, wherein:
the content of the first specific parameter and the second specific parameter are identical.

20. The non-transitory storage medium storing a program described in claim 16, the program further comprising causing the controller to:
enable receiving print data from any external device including the external device that sent the specific command after cutting the wireless connection in response to receiving the specific command.

21. A printing device comprising:
a printer that prints print data on recording media;
a link controller that communicates wirelessly with one plurality of external devices and receive the print data and a command; and
a central processing unit (CPU) that controls the printer and the link controller, the CPU connecting wirelessly to an external device through the link controller;
wherein controlling the printer based on the print data when the print data and a print command are received from the external device by the link controller, responsive to receiving a specific command appended to the print data including a command code and a first specific parameter, and prior to executing other of a plurality of commands appended to the print data, terminating the wireless connection between the external device and the link controller,
wherein the specific command is a type of command having priority over the other of the plurality of commands and enabling receiving thereof by the link controller even when an error occurs in the printing device, and
wherein the central processing unit detects the type of command by the command code and an instruction to terminate the wireless connection by the first specific parameter in the specific command.

* * * * *